Aug. 1, 1933.    A. LEVY    1,920,650
CONE MACHINE
Filed Dec. 7, 1932    2 Sheets-Sheet 1
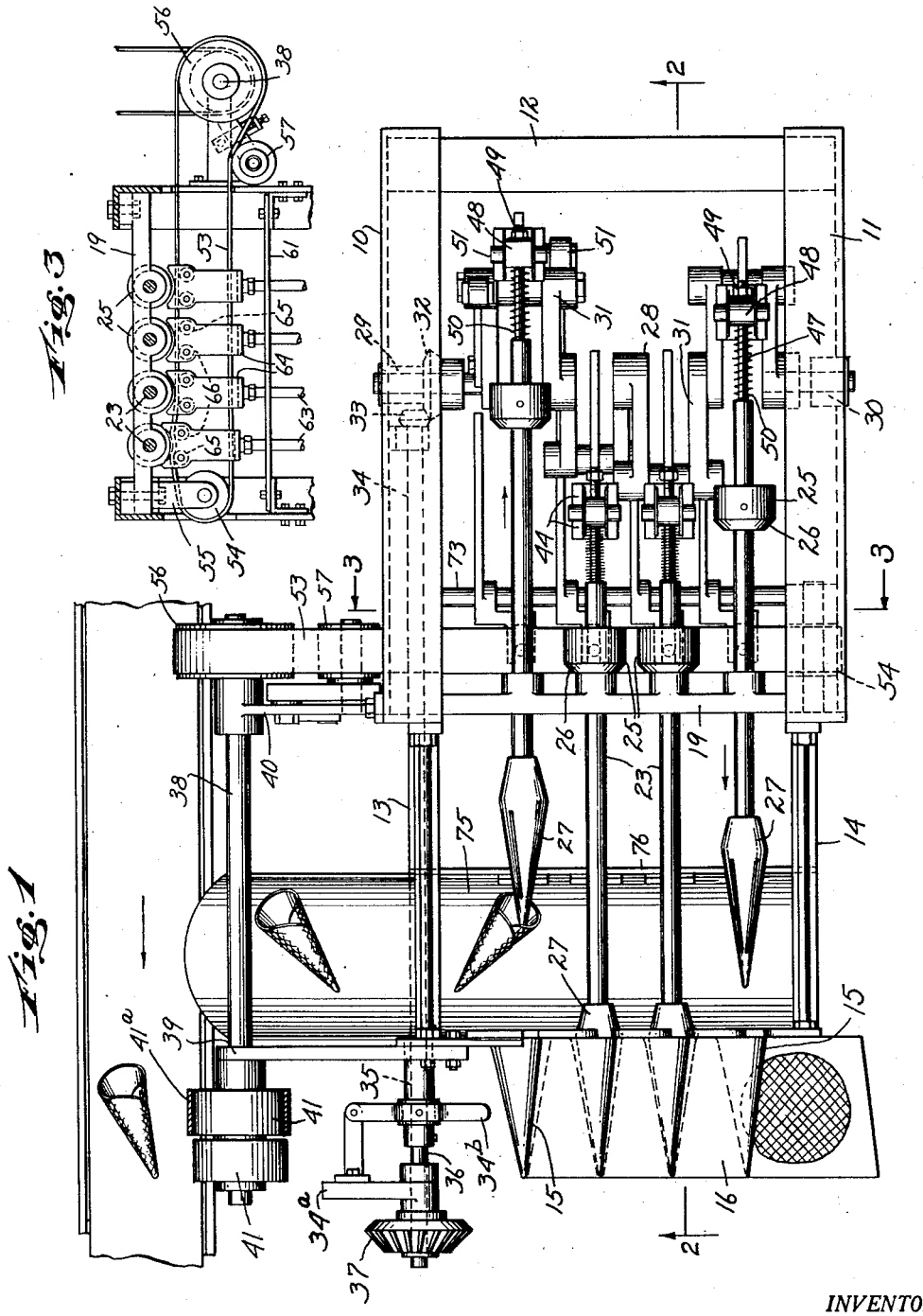
INVENTOR.
Abraham Levy
BY
Morris Finkelstein
ATTORNEY.

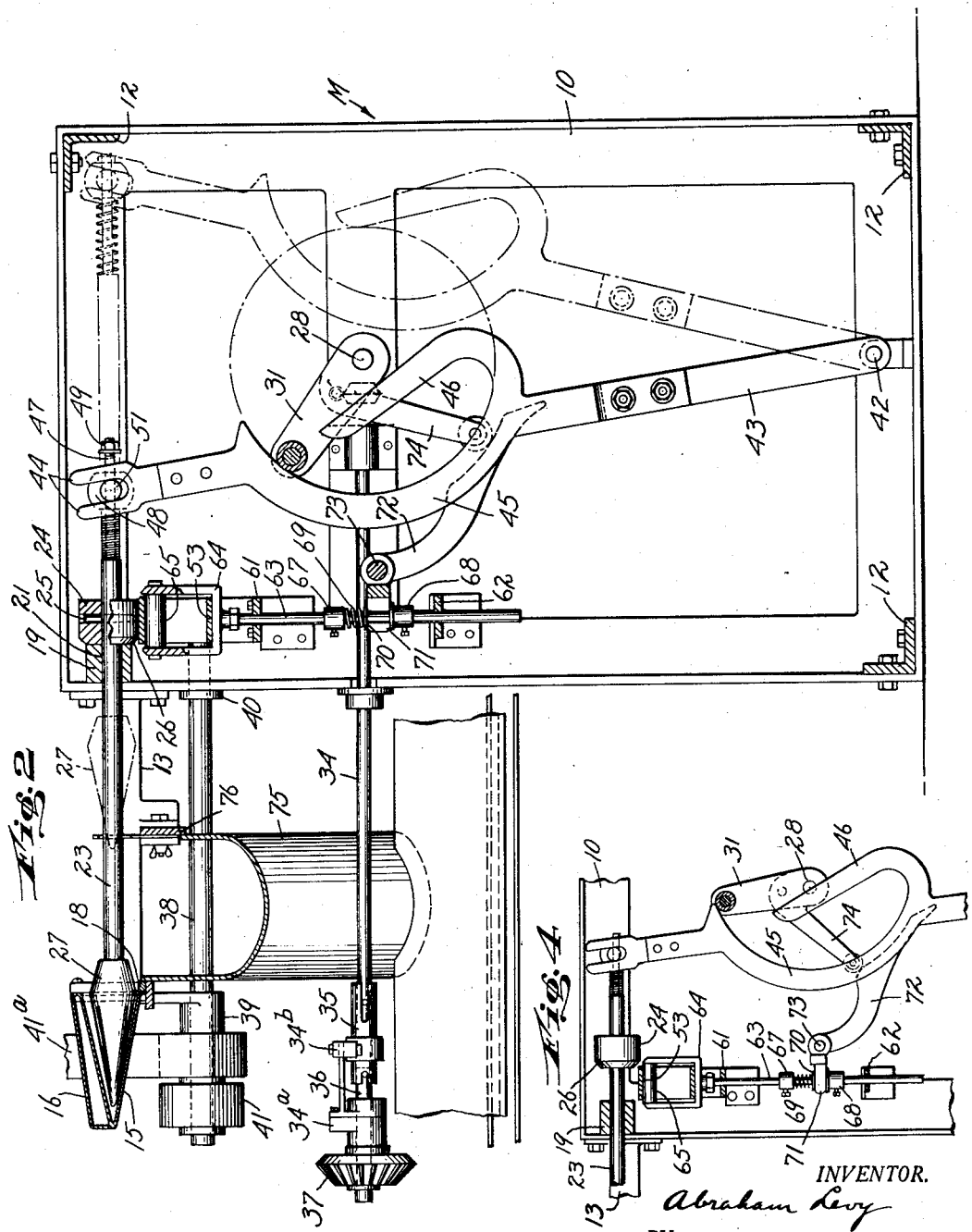

Patented Aug. 1, 1933

1,920,650

UNITED STATES PATENT OFFICE 1,920,650

CONE MACHINE

Abraham Levy, Brooklyn, N. Y.

Application December 7, 1932. Serial No. 646,121

5 Claims. (Cl. 107—58)

This invention relates to ice cream cone machines, and an object of this invention is to generally improve an ice cream cone machine of the type disclosed in Patent No. 1,576,011 issued on March 9th, 1926, to Harry G. Tatosian.

A further object of this invention is to provide a simplified machine of the character described, which shall be strong and rugged in construction, relatively inexpensive to manufacture, and practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of the various possible illustrative embodiments of this invention, Fig. 1 is a top plan view of a machine embodying the invention;

Fig. 2 is a cross-sectional view taken on line 2—2 of Fig. 1;

Fig. 3 is a cross-sectional view taken on line 3—3 of Fig. 1; and

Fig. 4 is a fragmentary, detailed view of the mechanism for operating the spindles.

Referring now in detail to the drawings, M designates a machine embodying the invention, and comprises a frame having rectangular side portions 10 and 11 connected by angle bars 12 and having secured to their respective forward sides adjacent the upper ends, a pair of forwardly projecting arms 13 and 14 upon which the conical molds described hereinafter, are supported. Said molds may be formed, as shown and described in said patent, of a single piece of sheet metal bent to produce a series of shaped conical mold portions 15 and inclined flat feeding portions 16, said feeding portions extending to the entrance slots of said mold portions. The feeding portions are substantially tangential to the inner periphery of the mold portions and the opposed wall or slot is flared to guide the flat cakes into the mold, where they are rolled into cone form by the rotation of the mandrels, as will hereinafter more fully appear. The cone molds are secured to an apertured plate 18 mounted on the forward ends of the arms 13 and 14.

Between the upper forward corners of the side frames 10 and 11 is secured a transverse, horizontal spindle support 19 provided with a series of bearing openings 21 in which the spindles 23 are slidably and rotatably mounted. Fixed adjacent the rear end of each spindle is a collar 24, said collars being fixed to the spindles by means of taper pins 25, or in any other suitable manner. For the purpose hereinafter appearing, the forward side of each collar is formed with a beveled annular surface 26. At their forward ends the spindles are provided with cone shaped mandrels 27 adapted, as the spindles are reciprocated forwardly as hereinafter described, to enter the cone molds and be rotated therein to roll the flat cakes into cones. The mechanism for reciprocating the spindles may be similar to that described in said patent and includes a crank shaft 28 journaled at its ends in bearing portions 29 and 30 of the side frames and provided with a series of angularly off-set crank portions 31 corresponding in number and placement to the spindles.

For continuously driving the crank shaft the same may be provided with a bevel gear 32 adjacent the side frame 10 which meshes with the bevel pinion 33 on one end of the drive shaft 34 journaled in said side frame. The opposite end of said shaft is connected by a clutch 35 with a short shaft 36 carrying a bevel gear 37 designed to mesh and be driven by a gear of a baking machine (not shown) but with which the cone making machine M may be timed to operate. The short shaft 36 may be journaled in a bracket 34a which may be secured to the baking machine. The clutch may be operated by hand lever 34b pivotally connected to the arm of said bracket. A belt driven shaft 38 is journaled in bearings 39 and 40 secured respectively to the forward end of arm 13 and the side frame 10, and is provided with tight and loose pulleys 41 driven by a belt 41a from any suitable source of power.

At the base of the frame there is mounted a transverse shaft 42 upon which a series of crank levers 43 are pivoted, the upper ends of said crank levers being forked, as at 44, for connection with the rear ends of the spindles. Intermediate each of the levers there is provided crank engaging cam portions providing a substantially semi-circular part 45 and a substantially straight part 46 extending upwardly from the lower end of said part 45 in spaced relation to the upper portion thereof. The roller ends of the respective crank portions of said crank shaft 28 move in relation to the inner surfaces of the cam portions to reciprocate the spindles into and out of engagement with the cone molds, the mandrels remaining in engagement with the molds for a predetermined period, during part of which they are rotated to roll the cones and then caused to dwell for a time while further pressure is applied.

The forked end of each of the crank levers is yieldably connected to its respective spindle, and for this purpose the latter is provided at its rear end with an extension rod 47 having a slide block 48 thereon normally pressed rearwardly against the stop nut 49 upon the end of the rod by means of a spring 50. The slide block is provided with projecting stud shaft portions 51 at each side for engagement with the forked end of the crank lever. This yielding connection permits the mandrels to engage the cone molds with cushioned contact and causes the same to yieldably press the cones in the molds in engaged position, as shown in Fig. 2 of the drawings.

Means is provided for intermittently rotating the spindles and mandrels to roll the cones. Said means comprises a continuous belt 53 having its upper transverse portion normally spaced below said collars 24 when the latter are in their most forwardly position. It will be noted that as the spindles are reciprocated the collars 24 move with said spindles. When the mandrels 27 are within the cone portions 15 the collars are substantially in contact with the member 19, and in this position overlie the belt 53. The belt 53 passes over a small roller 54 mounted on a bracket 55 hung from the underside of the support 19. Said belt 53 extends around a large pulley 56 mounted upon the end of the main drive shaft 38. An adjustable tightening roller 57 mounted in any suitable manner is adapted to be engaged with the underside of the belt 53 for taking up slack in said belt.

Between the side frames there are transversely supported beneath the belt 53, a pair of apertured supports 61 and 62 in which vertical rods 63 aligned beneath the rear pulleys 24 are mounted for reciprocation, being provided at their upper ends with yokes 64 extending at the sides of the belt and each having a pair of rollers 65 and 66 mounted therein and engaging the underside of the upper transverse portion of the belt. The rods 63 are provided between the supports with collars 67 and 68 beneath the upper of which is provided a coil spring 69 and a washer 70. Pivotally mounted on the transverse shaft 73 supported between the side frames, are crank levers 72 each having a forked end 71 engaging about one of the rods and between said washer 70 and the lower collar 68. The long arm of the lever 72 extends into the path of a rollered arm 74 secured upon its respective crank portion 31 of said crank shaft. Thus, as the crank shaft rotates the arms 74 engage their respective bell crank levers at predetermined points swinging them and causing the vertical rods 63 to be pressed against their respective rollers 65 and 66 upwardly to engage the rear portions of the continuously moving belt 53 with the collars 24 to thereby rotate the spindles and mandrels.

It will be obvious that the crank shaft portions are so arranged that the spindles are moved forwardly one after the other and that the spindle rotating mechanism is actuated for a short period after the mandrels are engaged with the cone rollers to roll the cones, the mandrels then remaining stationary for a short period and the cone molds under the pressure of the springs 50 which are compressed at the completion of the forward stroke of the crank levers. Below the inner open ends of the cone molds there may be provided an inclined chute 75. Mounted on a bar 76 parallel to the member 19 and connected to the arms 13 and 14 are a series of cone strippers shown and described in the aforesaid patent for removing the formed cones from the mandrels so that said cones may drop onto the chute 75.

It will be noted that each spindle is first moved rearwardly, then forwardly, then rotated and then moved rearwardly again, such operation being repeated for each spindle. By reason of the beveled portion 26 of each collar 24, said collars may readily be moved into overlying position with respect to the upper portion of the belt 53.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a cone making machine, the combination of a spindle having a conical mandrel, a conical mold, means for longitudinally shifting said spindle for moving said mandrel into and out of engagement with said mold, and means for rotating said spindle, comprising a collar fixed to said spindle, a continuously moving belt disposed transversely of said spindle and means for moving a portion of said belt into engagement with said collar when said mandrel is within said mold.

2. In a cone making machine, the combination of a spindle having a conical mandrel, a conical mold, means for longitudinally shifting said spindle for moving said mandrel into and out of engagement with said mold, and means for rotating said spindle, comprising a collar fixed to said spindle, a continuous belt disposed transversely of said spindle and means for moving a portion of said belt into engagement with said collar when said mandrel is within said mold, said collar having a beveled annular edge.

3. In a cone making machine, the combination of a spindle having a conical mandrel, at one end thereof, a conical mold, means for reciprocating said spindle for moving said mandrel into and out of engagement with said mold, a continuously driven belt disposed in a plane transversely of said spindle, means fixed on said spindle and rotatable and reciprocable therewith, and means for pressing a portion of said belt into engagement with said last means when said mandrel is within said mold for causing rotation of said spindle and mandrel.

4. In a cone making machine, the combination of a plurality of spindles having conical mandrels at adjacent ends thereof, a plurality of conical molds, means for reciprocating said spindles in sequence for moving said mandrels in and out of engagement with said molds successively, a continuously driven belt disposed transversely of said spindles, a collar fixed adjacent the rear end of each spindle, and means for pressing portions of said belt against said collars for rotating each spindle when the mandrel thereof is within its respective mold.

5. In a cone making machine, the combination of a plurality of spindles having conical mandrels at adjacent ends thereof, a plurality of conical molds, means for reciprocating said spindles in sequence for moving said mandrels in and out of engagement with said molds successively, a continuously driven belt disposed transversely of said spindles, a collar fixed adjacent the rear end of each spindle, and means for pressing portions of said belt against said collars for rotating each spindle when the mandrel portion thereof is within its respective mold, the annular edge of each collar on the side thereof adjacent the mandrels being beveled as and for the purpose described and specified.

ABRAHAM LEVY.